United States Patent [19]
Larkin

[11] Patent Number: 6,135,482
[45] Date of Patent: Oct. 24, 2000

[54] HITCH ADAPTER

[76] Inventor: Kenneth M. Larkin, 342 SE. Evergreen Ave., Redmond, Oreg. 97756

[21] Appl. No.: 09/115,579

[22] Filed: Jul. 14, 1998

Related U.S. Application Data

[60] Provisional application No. 60/052,470, Jul. 14, 1997.

[51] Int. Cl.[7] .................................................. B52D 53/00
[52] U.S. Cl. ......................................................... 280/416.1
[58] Field of Search ........................... 280/415.1, 416.1, 280/417.1, 433, 491.1, 491.5

[56] References Cited

U.S. PATENT DOCUMENTS

| | | |
|---|---|---|
| D. 243,000 | 1/1977 | Carnes . |
| 3,698,740 | 10/1972 | Chisholm et al. . |
| 3,733,089 | 5/1973 | Goecke et al. . |
| 3,797,863 | 3/1974 | Cunha ................................ 280/476 R |
| 3,802,716 | 4/1974 | Wiers .................................... 280/34 R |
| 3,813,114 | 5/1974 | Berends . |
| 3,820,821 | 6/1974 | Leland . |
| 3,889,978 | 6/1975 | Kann . |
| 3,941,407 | 3/1976 | Breford ................................ 280/415 A |
| 4,125,272 | 11/1978 | Putnam, Jr. et al. . |
| 4,261,594 | 4/1981 | Corbett et al. . |
| 4,296,941 | 10/1981 | Van Wassenhove . |
| 4,367,884 | 1/1983 | Johnson et al. . |
| 4,428,595 | 1/1984 | Martin et al. . |
| 4,433,853 | 2/1984 | Swaim . |
| 4,738,464 | 4/1988 | Putnam . |
| 4,832,358 | 5/1989 | Bull . |
| 5,342,076 | 8/1994 | Swindall . |
| 5,354,087 | 10/1994 | Head . |
| 5,382,109 | 1/1995 | Nyman . |

OTHER PUBLICATIONS

Advertisement, Mumby RV Hitch Adapter, Mumby Manufacturing Ltd.
Brochure, Putnam Hitch Products USA Firehawk Fifth Wheel & Gooseneck Assembly, Putnam Hitch Products, Inc.
Advertisement—Mumby Manufacturing Ltd. Mumby RV Hitch Adapter.
Advertisement—Mumby Manufacturing Ltd. Slick & Clean Ball Hitch.
Advertisement—Colibert Enterprises Concealed Ball Hitch for Gooseneck Trailers.

*Primary Examiner*—Robert J. Oberleitner
*Assistant Examiner*—C. T. Bartz
*Attorney, Agent, or Firm*—Kolisch, Hartwell, Dickinson, McCormack & Heuser

[57] ABSTRACT

A hitch adapter includes an elongate frame having a first end with a kingpin socket assembly mounted thereon for receipt of a kingpin. A second end of the frame has a hitch ball receiver mounted thereon for attachment to a hitch ball. The kingpin receiver typically employs a glip member configured to embrace kingpin mounting structure of a trailer when the trailer's kingpin is received within the kingpin receiver. The hitch ball receiver includes a socket which accommodates universal movement of the adapter relative to the ball mount. The frame may be telescoping to provide for ready adjustment of the adapter for use in connection with various trailers.

12 Claims, 5 Drawing Sheets

HITCH ADAPTER

CROSS-REFERENCE TO RELATED APPLICATIONS

This application claims priority from U.S. Provisional Patent Application Ser. No. 60/052,470 entitled "HITCH ADAPTER" filed on Jul. 14, 1997.

TECHNICAL FIELD

The present invention relates generally to hitches, and more particularly, to a hitch adapter for use in coupling a first vehicle having a kingpin to a second vehicle having a hitch ball.

BACKGROUND ART

For many years, the most common type of trailer hitch has been the ball hitch, a ball mounted at or near the rear bumper of a towing vehicle for receipt within a cooperating socket mounted at or near a forward end of a trailer. These hitches have acquired popularity due to their simplicity, and due to the universal movement which is possible when using a ball hitch. It will be appreciated, for example, that such hitches typically accommodate pivot about orthogonal axes, due at least in part to the spherical nature of conventional ball mounts.

Recently, however, fifth wheel hitches have gained popularity due to a perceived improvement to towing safety, based on the position and style of the hitch. Fifth wheel hitches, it will be understood, employ a kingpin which is secured to a gooseneck trailer for receipt in a fifth wheel hitch socket assembly mounted on the towing vehicle (typically, in the bed of a pick-up truck). The fifth wheel hitch socket assembly is adapted to selectively grip the kingpin, generally via clamping structure which closes around a groove in the kingpin. Accordingly, although the kingpin generally does allow side-to-side pivot of the trailer, it restricts the type of universal movement possible with most ball hitches. These hitches also typically employ protruding clamping structure which may interfere with normal vehicle use. Fifth wheel hitches thus have heretofore fallen short of consumer expectations.

In an attempt to further improve utility, hitch makers have once again tuned to the basic concept embodied by ball hitches, but with the certain adaptations intended to employ advantages provided by fifth wheel hitches. Accordingly, ball hitches have been adapted for improved mounting, typically by mounting the hitch in the bed of a tuck such that a gooseneck trailer may be used. Such ball hitches are described, for example, in U.S. Pat. No. 5,435,585 to James W. Chambers, and in U.S. Pat. No. 5,571,270 to Kenneth M. Larkin, both of which are subject to common ownership herewith. The disclosures of these patents are incorporated herein by this reference.

Unfortunately, most gooseneck trailers are fitted with a kingpin for use in connection with a fifth wheel receiver, and thus are not suited for use in connection to a towing vehicle which employs a ball mount. Although makeshift adapters have been proposed for use in converting a ball mount into a fifth wheel receiver, such adapters typically involve complicated structure which detracts from the very benefits the ball hitch is intended to provide. What is needed is a hitch adapter which is configured for use in readily coupling a kingpin-type trailer with a towing vehicle which employs a ball mount. It would be further desirable for such adapter to accommodate the type of universal movement common to ball hitches without detracting from stability or stowability of the hitch.

DISCLOSURE OF THE INVENTION

The aforementioned need is addressed by provision of a hitch adapter which includes an elongate frame having a first end with a kingpin socket assembly mounted thereon for receipt of a kingpin, and a second end having a hitch ball receiver mounted thereon for attachment to a hitch ball. The kingpin receiver typically employs a grip member configured to embrace kingpin mounting structure of a trailer when the trailer's kingpin is received within the kingpin receiver. The hitch ball receiver includes a socket which accommodates universal movement of the adapter relative to the ball mount. The frame may be telescoping to provide for ready adjustment of the adapter for use in connection with various trailers.

In the preferred embodiment, the king pin receiver includes a beating plate which defines a kingpin-receiving slot, and includes a locking member which is pivotally mounted on the bearing plate for selected placement in an orientation wherein the locking member extends across said kingpin-receiving slot to secure the kingpin in place. The locking member may take the form of a generally U-shaped locking plate which defines a kingpin-locking slot corresponding to the kingpin-receiving slot. Accordingly, when the locking plate is placed in a first orientation, the locking plate leaves said kingpin-receiving slot clear to receive the kingpin. When the locking plate is placed in a second orientation, the kingpin-locking slot extends transverse to the kingpin-receiving slot to hold the kingpin in place.

The locking plate typically is biased toward the first orientation, but is held in the second orientation by a movable stop which selectively engages the locking plate. The stop preferably takes the form of an elongate rod movable along a linear path in a plane defined by pivot of the locking plate. The locking plate defines a notch configured to receive the rod when the locking plate is in the second orientation, thereby preventing further pivot of the locking plate.

The hitch ball receiver preferably includes a base with a ball-receiving opening configured to receive a hitch ball, and a keeper movably mounted on the base for selected placement in a position wherein the keeper overlaps the ball-receiving opening to secure the hitch ball in place. A lever typically is provided to move the keeper between a first position wherein the opening is clear, and a second position wherein the keeper at least partially overlaps the ball-receiving opening to hold the hitch ball in place. The lever preferably is biased to move the keeper toward the second position.

In another embodiment, the adapter is configured for connection to a trailer having a mount which defines a predetermined mount fastener arrangement. The adapter includes an elongate frame, a first coupler mounted on the first end of the frame for attachment to the mount of the trailer, and a second coupler mounted on the second end of the frame for attachment to a towing vehicle. The first coupler defines a predetermined first coupler fastener arrangement corresponding to the predetermined mount fastener arrangement. The second coupler includes a hitch ball receiver configured to selectively receive and hold a hitch ball of the towing vehicle. As described previously, the hitch ball receiver typically includes a ball-receiving opening fitted with a hand-actuated keeper which moves between a first position wherein the opening is clear, and a second position wherein the keeper at least partially overlaps the opening to hold the hitch ball in place.

The present invention will be more readily understood after a consideration of the drawings and the detailed description which follows.

Figure 1:
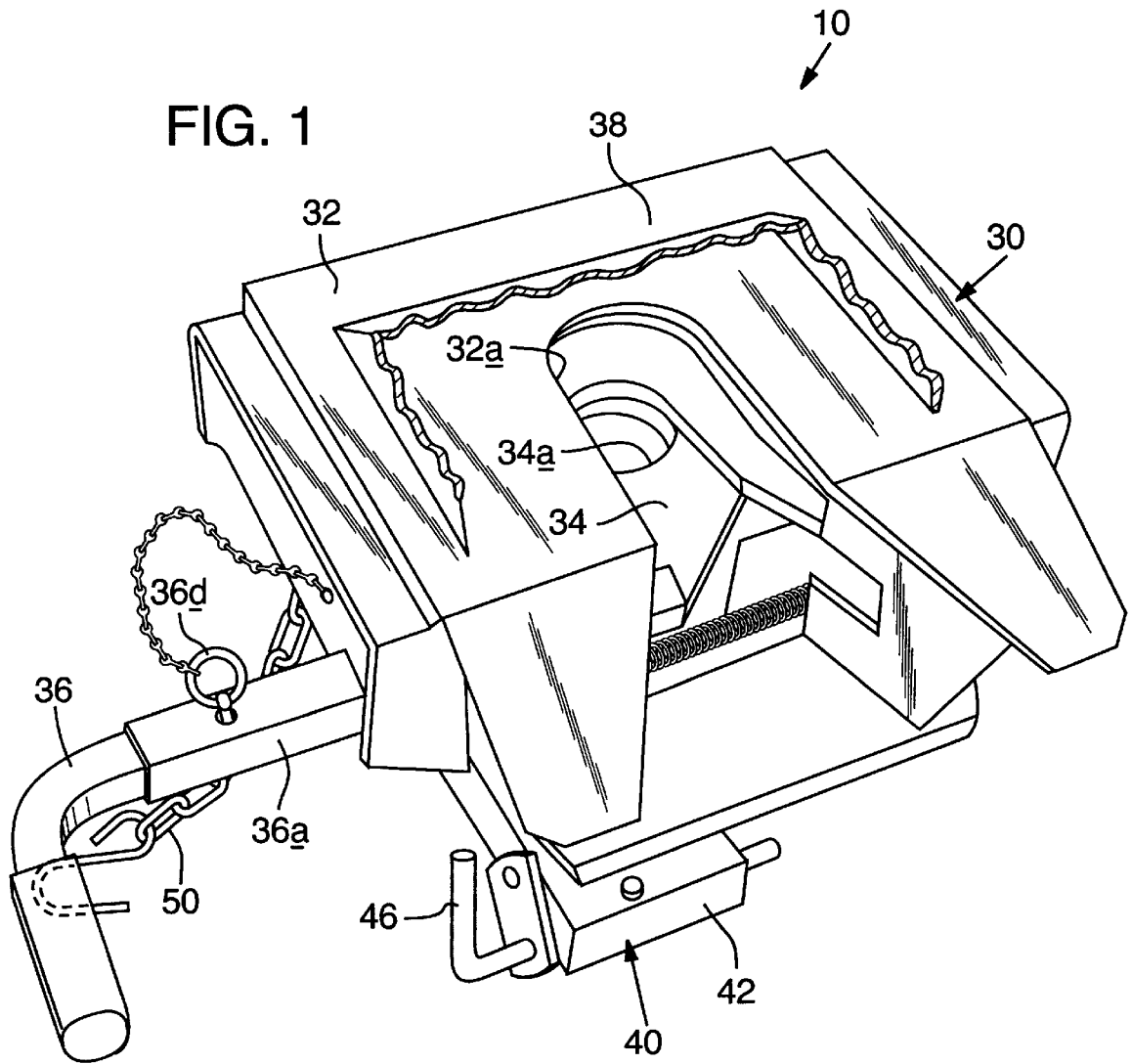
FIG. 1 is an isometric top view of a hitch adapter constructed in accordance with a first embodiment of the invention.

DETAILED DESCRIPTION OF THE PREFERRED EMBODIMENT AND BEST MODE OF CARRYING OUT THE INVENTION

Referring initially to FIGS. 1 through 4, a hitch adapter 10 is shown for use in coupling a trailer 12 with a towing vehicle 14. As indicated, trailer 12 takes the form of a conventional recreational trailer having a kingpin mount 12a. The second vehicle takes the form of a pick-up truck having a ball mount 14a. The kingpin mount is positioned to give the trailer a gooseneck trailer configuration. The ball mount is positioned in the truck bed.

Figure 4:
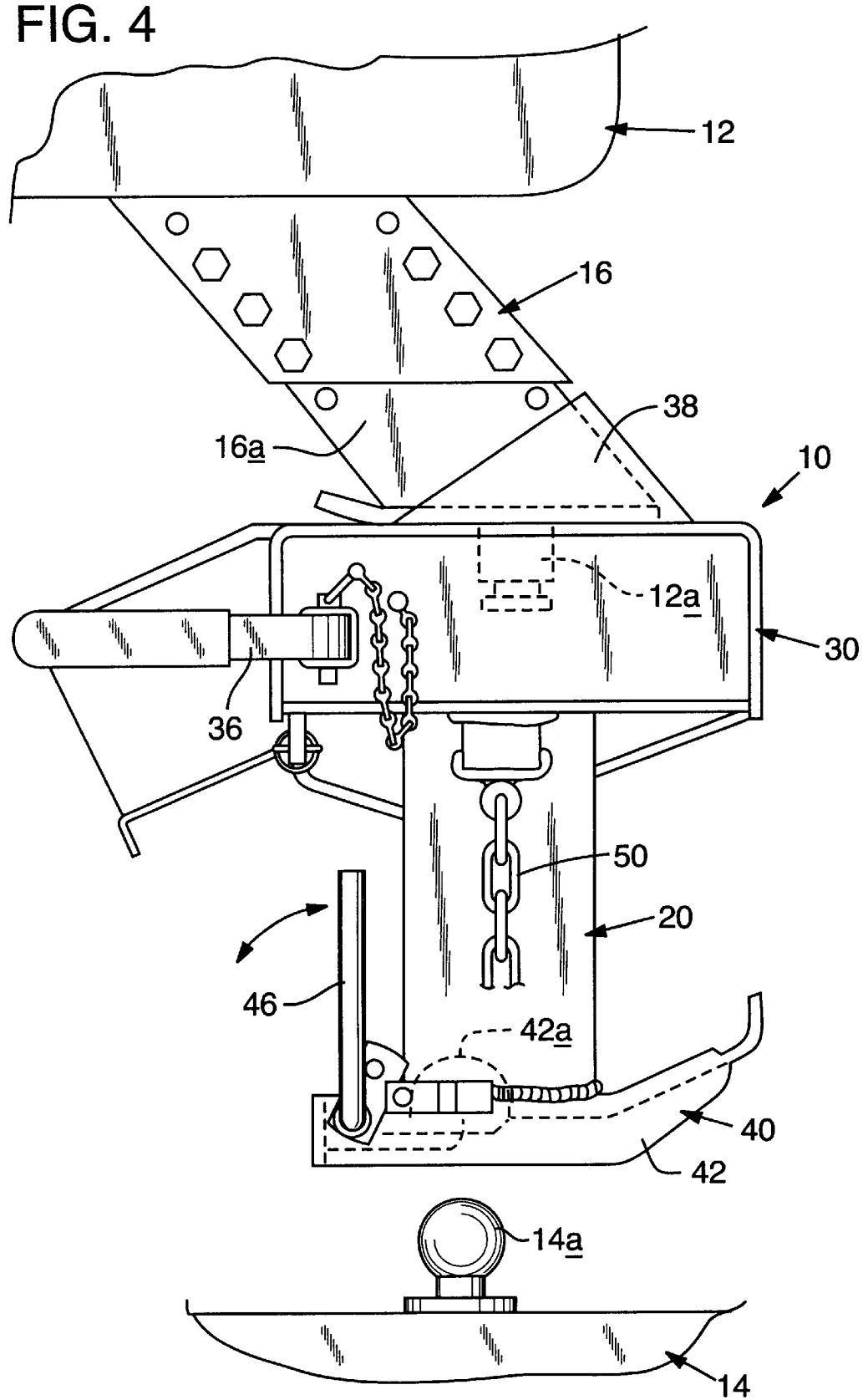
FIG. 4 is a side elevational view of the hitch adapter shown in FIG. 1, the adapter being shown in connection with a trailer having a kingpin-type hitch and a towing vehicle having a ball mount.

As best shown in FIG. 4, the hitch adapter includes an elongate frame 20 having a first end fitted with a kingpin receiver 30 and a second end fitted with a hitch ball receiver 40. The kingpin receiver is configured for attachment to the trailer by receipt of the trailer's kingpin. The hitch ball receiver is configured for attachment to the towing vehicle by receipt of the towing vehicle's hitch ball. Preferably, hitch ball 14a is retractable, or removable, to provide a system which interferes only minimally with normal use of the truck bed when a trailer is not being towed. The adapter thus typically first is attached to the trailer, and then is attached to the properly configured hitch ball. Safety chains 50 extend from the hitch adapter, typically for use in providing a supplemental connection between the adapter and the towing vehicle.

Focusing on the kingpin connection joint, it will be noted that the kingpin receiver includes a bearing plate 32 which defines a kingpin-receiving slot 32a configured to guide kingpin 12a into a generally central area of the bearing plate. A locking plate 34 is mounted beneath the bearing plate, the mounting plate being defined with a kingpin-locking slot 34a which corresponds generally to the kingpin-receiving slot. Both the kingpin-bearing plate and the kingpin-locking plate thus will be seen to define similar U shaped slots.

Figure 2:
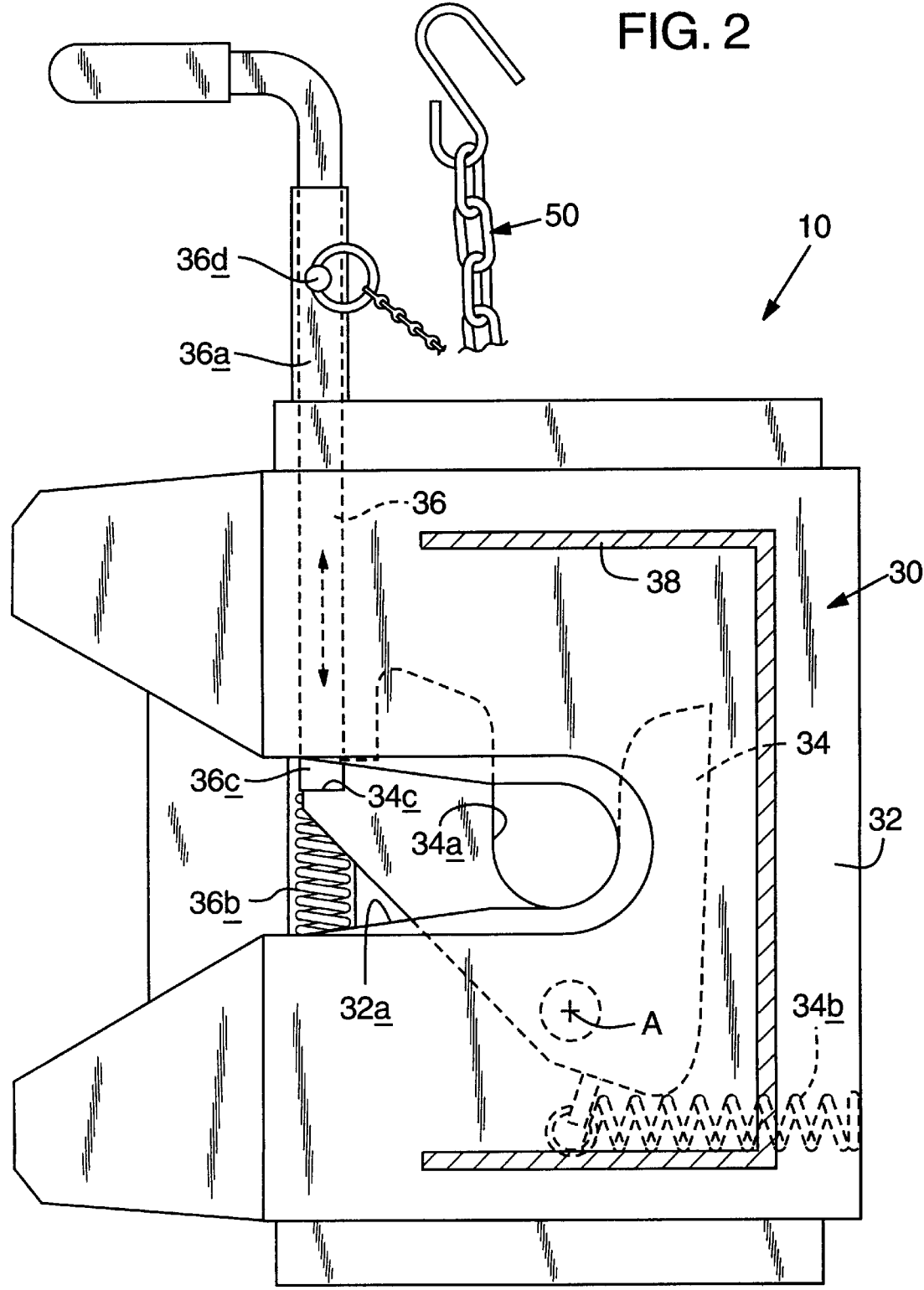
FIG. 2 is top plan view which demonstrates operation of a kingpin receiver forming a pair of the hitch adapter shown in FIG. 1.
Figure 3:
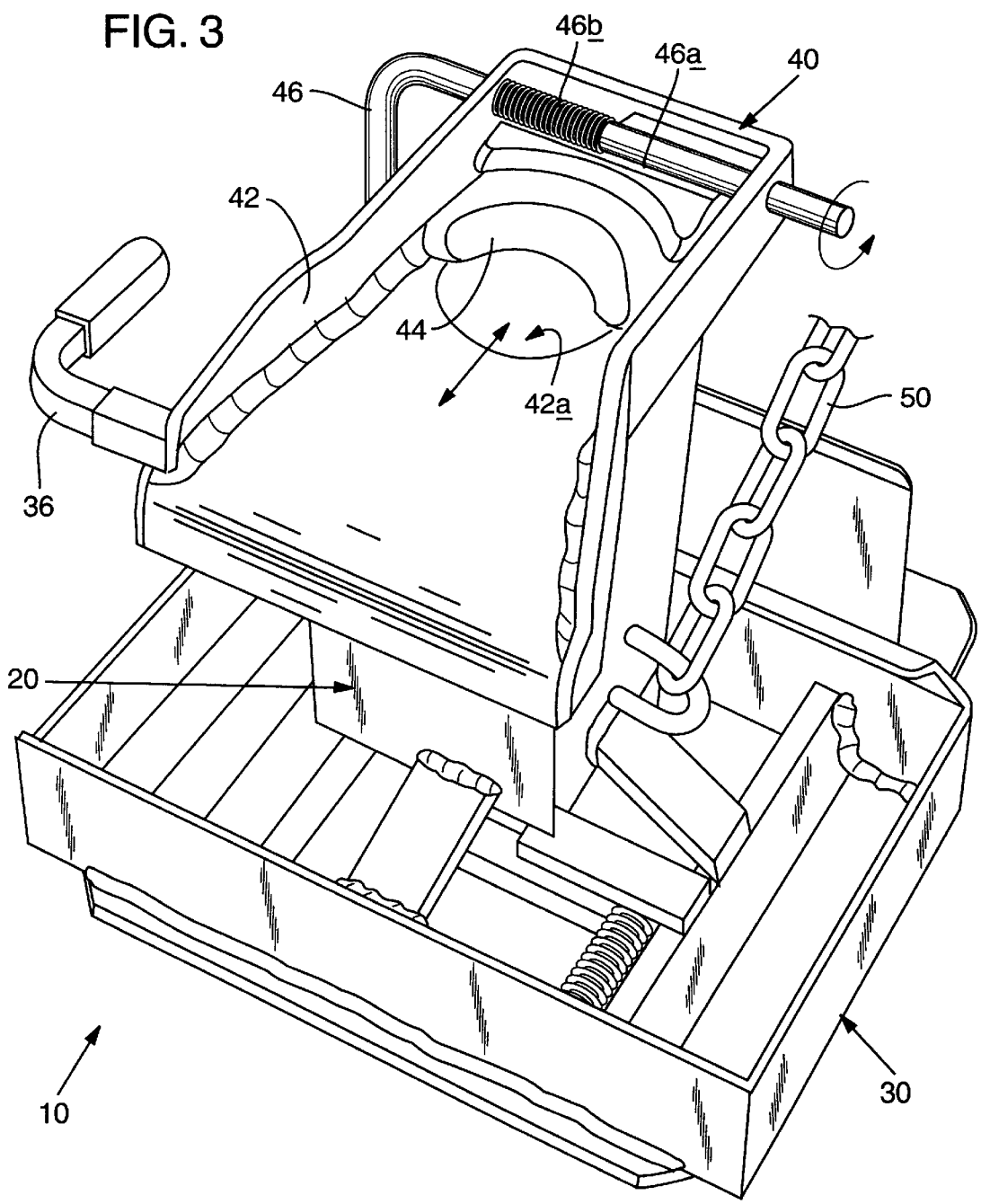
FIG. 3 is an isometric bottom view of the hitch adapter shown in FIG. 1.

The locking plate is pivotally mounted on the bearing plate for rotation (about an axis A) between a first orientation wherein the kingpin-locking slot overlaps the kingpin-receiving slot (FIG. 1), and a second orientation wherein the locking plate extends across said kingpin-receiving slot to secure the kingpin in place (FIG. 2). Accordingly, when the locking plate is placed in the first orientation, the locking plate leaves said kingpin-receiving slot clear to receive the kingpin. When the locking plate is placed in the second orientation, the kingpin-locking slot extends transverse to the kingpin-receiving slot to hold the kingpin in place.

The locking plate typically is spring-biased toward the first orientation, but is held in the second orientation by a movable stop which selectively engages the locking plate. Spring-bias preferably is provided by spling 34b. The stop preferably takes the form of an elongate, spring-biased rod 36 which is movable along a linear rod path defined by sleeve 36a. The rod path is in a plane defined by pivot of the locking plate. The rod is biased by a spring 36b toward engagement with the locking plate, the locking plate defining a notch 34c which is configured to receive a distal end 36c of the rod. The rod thus may be used to prevent further pivot of the locking plate when the locking plate is in the second orientation. A pin 36d also may be provided to selectively lock the rod in place.

The upper surface of bearing plate 32 is generally planar, but includes a grip member in the form of a shoe 38 configured to receive the kingpin mounting structure 16. More particularly, the grip member takes the form of a generally triangular socket adapted to capture a foot portion 16a of the kingpin mounting structure. The grip member similarly may take the form of a strap such as an adjustable belt, or other holding mechanism configured to grip the kingpin mounting structure so as to hold the kingpin mounting structure in place relative to the hitch adapter. This effectively diminishes "play" in the connection between the kingpin and the adapter so as to accommodate a stable connection between the trailer and the towing vehicle.

Hitch ball receiver 40 includes a base 42 with a ball-receiving opening 42a configured to selectively receive the hitch ball therein. A keeper 44 is movably mounted on the base for selected movement between a first orientation (FIG. 3) wherein the keeper overlaps the ball-receiving opening to secure the hitch ball in place, and a second orientation wherein the keeper allows insertion/removal of the hitch ball. The keeper typically is operated via a lever 46 which moves the keeper along a predefined track defined by base 42. The keeper is moved via a tab 46a attached to the lever which selectively directs the keeper between a first orientation wherein the keeper at least partially overlaps the ball-receiving opening to hold the hitch ball in place, and the second orientation wherein the opening is clear. The lever preferably is spring-biased by spring 46b to urge the keeper toward the second orientation so as to secure the hitch ball in place.

In one embodiment of the invention, the frame is telescoping to accommodate adjustment of the adapter for use in connection with various trailer/towing vehicle combinations. This may be accomplished through the use of telescoping frame segments, or by other suitable telescoping combination of the kingpin receiver, the frame and the hitch ball receiver.

Figure 5:
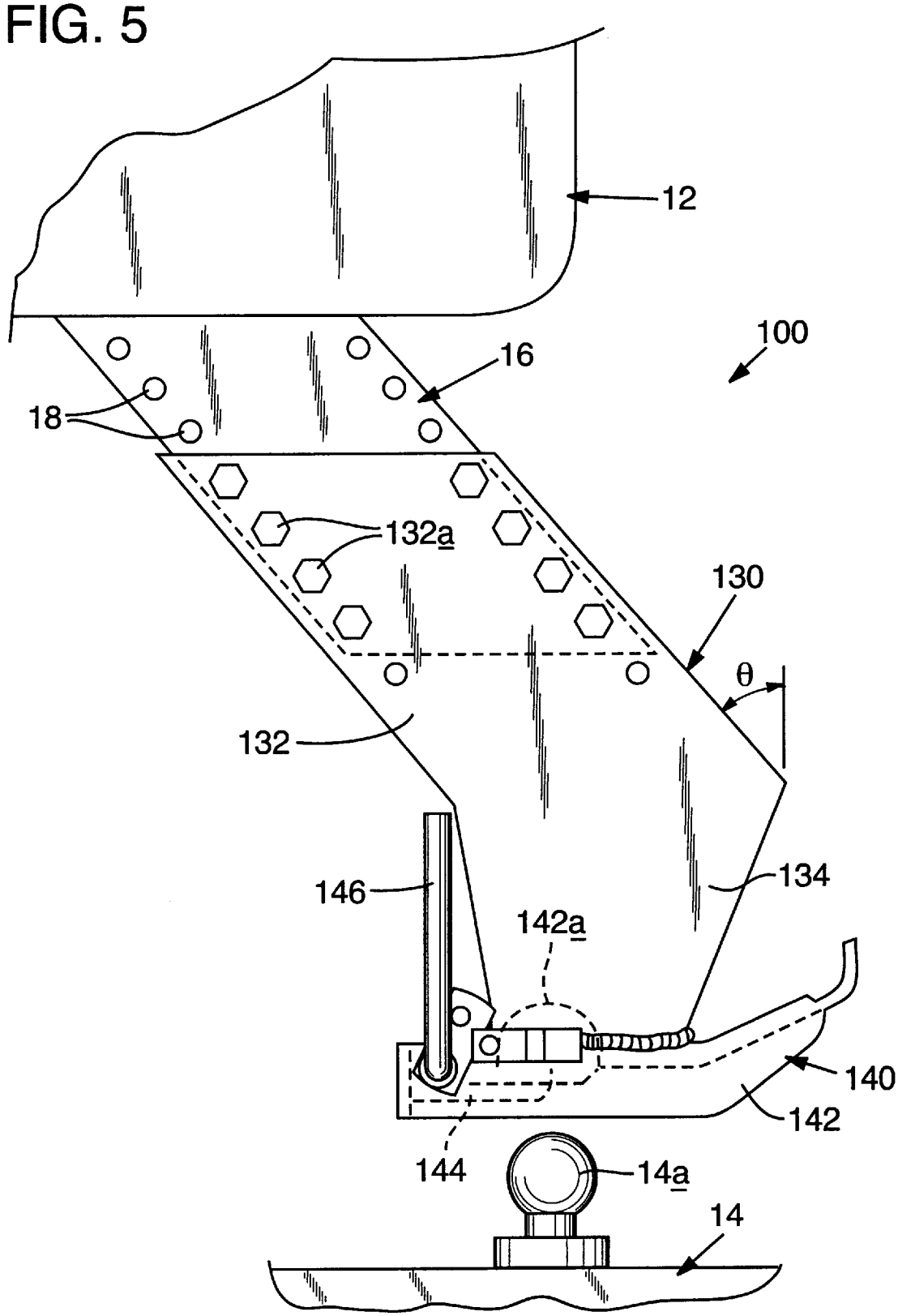
FIG. 5 is a side elevational view of a hitch adapter constructed in accordance with an alternative embodiment of the invention, the adapter being shown in connection with a trailer having a predetermined mount fastener arrangement and a towing vehicle having a ball mount.

FIG. 5 shows an alternative embodiment hitch adapter at 100, such adapter being configured for use in coupling a trailer 12 with a towing vehicle 14. As indicated, the trailer takes the form of a gooseneck trailer having a mounting structure 16 with predetermined fastener mounting arrangement 18. In the depicted embodiment, the fastener mounting arrangement takes the form of apertures suited for receipt of fasteners such as bolts. The towing vehicle takes the form of a pick-up truck fitted with a ball mount 14a. Accordingly, adapter 100 provides for coupling of a predetermined fastener mounting arrangement with a conventional ball mount.

As indicated, adapter 100 includes an elongate hollow frame 130 which is suited for telescoping combination with mounting structure 16. The frame includes an upper section 32 which extends at a first angle θ from vertical, and a lower section 34 which extends downwardly from the upper section to secure to the ball mount. Angle θ may be virtually any angle, but preferably is an angle which corresponds to the applied angle of conventional gooseneck trailer mounts.

The upper section is provided with a first coupler mounted on a first end of the frame. The first coupler takes the form of fasteners 132a which correspond in position and shape to the predetermined fastener mounting arrangement of the mount structure. The frame thus may telescopingly receive the mounting structure to secure the adapter to the trailer. Alternatively, the frame may itself be received in the mounting structure.

The lower section is provided with a second coupler mounted on a second end of the frame for attachment to a towing vehicle. As indicated, the second coupler includes a hitch ball receiver configured to selectively receive and hold a hitch ball of the towing vehicle. As described previously, the hitch ball receiver typically includes a base 142 with a ball-receiving opening 142a configured to receive the hitch ball. The base plate also is fitted with a hand-actuated keeper 144 which moves between a first position wherein the opening is clear, and a second position wherein the keeper at least partially overlaps the opening to hold the hitch ball in place. The keeper is operated by a lever 146.

Furthermore, while the present invention has been shown and described with reference to the foregoing operational principles and preferred embodiment, it will be apparent to those skilled in the art that other changes in form and detail may be made therein without departing from the spirit and scope of the invention as defined in the appended paragraphs.

I claim:

1. A hitch adapter for use in coupling a trailer which has a kingpin connector with a towing vehicle which has a ball connector, said hitch adapter comprising:
    an elongate, generally vertical frame having first and second ends;
    a kingpin receiver mounted on said first end of said frame for attachment to the kingpin connector of the trailer, said kingpin receiver including a load-bearing plate which defines a kingpin-receiving slot, and an elongate locking member mounted on said load-bearing plate for movement between a first orientation wherein said locking member leaves said kingpin-receiving slot clear to receive a kingpin of the kingpin connector and a second orientation wherein said locking member extends transverse to said kingpin-receiving slot to secure the kingpin in said kingpin-receiving slot; and
    a hitch ball receiver mounted on said second end of said frame for attachment to the ball connector of the towing vehicle, said hitch ball receiver including a base which defines a ball-receiving opening configured to receive a hitch ball of the ball connector, and a keeper mounted on said base for movement between a first position wherein said ball-receiving opening is clear, and a second position wherein said keeper at least partially overlaps said ball-receiving opening to hold the hitch ball in place.

2. The hitch adapter of claim 1, wherein the king pin is mounted on a projecting arm of the trailer, said first coupler further including a strap member configured to embrace the projecting arm of the trailer when the king pin receiver receives the king pin.

3. The hitch adapter of claim 2, wherein the strap member is a sleeve configured to closely receive the projecting arm of the trailer.

4. The hitch adapter of claim 1, wherein said locking member is biased toward said first orientation, and wherein said kingpin receiver includes a movable stop configurable to selectively engage said locking member to maintain said locking member in said second orientation.

5. The hitch adapter of claim 1, wherein said locking member is pivotally movable between said first orientation and said second orientation along a pivot path in a plane defined by said locking member, and said stop is an elongate rod movable along a linear path in the plane defined by said locking member, said locking member defining a notch configured to receive said rod when said locking member is in said second orientation and thus to prevent further pivot of said locking member.

6. A hitch adapter for use in coupling a first vehicle which has a projecting arm with a kingpin mounted thereon with a second vehicle which has a hitch ball positioned thereon, said hitch adapter comprising:
    an elongate frame having opposite first and second ends;
    a first coupler mounted on said first end of said frame for attachment to the first vehicle, said first coupler including a king pin receiver configured to receive and hold the king pin of the first vehicle and a strap member configured to embrace the projecting arm of the first vehicle when the king pin receiver receives the king pin; and
    a second coupler mounted on said second end of said frame for attachment to the second vehicle, said second coupler including a hitch ball receiver configured to receive and hold the hitch ball of the second vehicle.

7. The hitch adapter of claim 6, wherein the strap member is a sleeve configured to closely receive the projecting arm of the first vehicle.

8. A hitch adapter for use in coupling a first vehicle which has a kingpin positioned mounted thereon with a second vehicle which has a hitch ball positioned thereon, said hitch adapter comprising:
    an elongate frame having opposite first and second ends;
    a first coupler mounted on said first end of said frame for attachment to the first vehicle, said first coupler including a king pin receiver configured to receive and hold the king pin of the first vehicle; and
    a second coupler mounted on said second end of said frame for attachment to the second vehicle, said second coupler having a hitch ball receiver including a base which defines a ball-receiving opening configured to receive a hitch ball, and a keeper movably mounted on said base for selected placement in a position wherein said keeper overlaps said ball-receiving opening to secure the hitch ball in place.

9. The hitch adapter of claim 8, wherein said hitch ball receiver further includes a lever configured to move said keeper between a first position wherein said opening is clear, and a second position wherein said keeper at least partially overlaps said ball-receiving opening to hold the hitch ball in place.

10. The hitch adapter of claim 9, wherein said lever is biased to move said keeper toward said second position.

11. A hitch adapter for connection to a trailer having a kingpin mount which defines a predetermined mount fastener arrangement, the hitch assembly comprising:
    an elongate frame having first and second ends;
    a first coupler mounted on said first end of said frame for attachment to the kingpin mount of the trailer, said first coupler defining a predetermined first coupler fastener arrangement corresponding to the predetermined mount fastener arrangement, said frame being telescopically received by the kingpin mount; and a second coupler mounted on said second end of said frame for attachment to a towing vehicle, said second coupler including a hitch ball receiver configured to selectively receive and hold a hitch ball of the towing vehicle.

12. A hitch adapter for connection to a trailer having a kingpin mount which defines a predetermined mount fastener arrangement, the hitch adapter comprising:

an elongate frame having first and second ends, a first segment configured to extend from the kingpin mount at a first predetermined angle when the hitch adapter is attached to the kingpin mount, and a second segment configured to extend generally vertically from the first segment when the hitch adapter is attached to the kingpin mount;

a first coupler mounted on said first end of said frame for attachment to the kingpin mount of the trailer, said first coupler defining a predetermined first coupler fastener arrangement corresponding to the predetermined mount fastener arrangement; and a second coupler mounted on said second end of said frame for attachment to a towing vehicle, said second coupler including a hitch ball receiver configured to selectively receive and hold a hitch ball of the towing vehicle.

* * * * *